US009645920B2

(12) United States Patent
Gole et al.

(10) Patent No.: US 9,645,920 B2
(45) Date of Patent: May 9, 2017

(54) ADAPTIVE CACHE MEMORY CONTROLLER

(71) Applicant: Marvell World Trade LTD., St. Michael (BB)

(72) Inventors: Abhijeet P. Gole, Cupertino, CA (US); Ram Kishore Johri, San Jose, CA (US)

(73) Assignee: Marvell World Trade LTD., St. Michael (BB)

( * ) Notice: Subject to any disclaimer, the term of this patent is extended or adjusted under 35 U.S.C. 154(b) by 163 days.

(21) Appl. No.: 14/313,055

(22) Filed: Jun. 24, 2014

(65) Prior Publication Data

US 2014/0379965 A1 Dec. 25, 2014

Related U.S. Application Data

(60) Provisional application No. 61/839,085, filed on Jun. 25, 2013.

(51) Int. Cl.
*G06F 12/00* (2006.01)
*G06F 12/02* (2006.01)
*G06F 12/0802* (2016.01)
*G06F 12/0871* (2016.01)

(52) U.S. Cl.
CPC ...... *G06F 12/0246* (2013.01); *G06F 12/0802* (2013.01); *G06F 12/0871* (2013.01); *G06F 2212/222* (2013.01); *G06F 2212/7208* (2013.01)

(58) Field of Classification Search
CPC ............. G06F 12/0246; G06F 12/0802; G06F 12/0871; G06F 2212/222; G06F 2212/7208
See application file for complete search history.

(56) References Cited

U.S. PATENT DOCUMENTS

| 8,417,871 B1* | 4/2013 | de la Iglesia ....... G06F 11/2094 711/114 |
| 2005/0141312 A1 | 6/2005 | Sinclair et al. |
| 2006/0059308 A1* | 3/2006 | Uratani ................. G06F 3/0607 711/114 |
| 2009/0193174 A1* | 7/2009 | Reid .................... G06F 12/0246 711/100 |

(Continued)

OTHER PUBLICATIONS

International Search Report and Written Opinion for Application No. PCT/US2014/043844 filed Jun. 24, 2014; dated Oct. 7, 2014; 9 Pages.

*Primary Examiner* — Charles Rones
*Assistant Examiner* — Nanci Wong

(57) ABSTRACT

A system comprises a partitioning module and a writing module. The partitioning module is configured to partition each of a plurality of solid-state disks into a plurality of blocks. Each of the plurality of blocks has a predetermined size. The writing module is configured to write data to one or more of the plurality of solid-state disks in a sequence starting from a first block of a first solid-state disk of the plurality of solid-state disks to a first block of a last solid-state disk of the plurality of solid-state disks, and subsequently starting from a second block of the first solid-state disk to a second block of the last solid-state disk. In each of each of the plurality of the plurality of solid-state disks, the second block is subsequent to the first block.

22 Claims, 14 Drawing Sheets

(56) References Cited

U.S. PATENT DOCUMENTS

| | | | |
|---|---|---|---|
| 2011/0191523 A1* | 8/2011 | Caulkins | G06F 12/0868 711/103 |
| 2011/0289255 A1* | 11/2011 | Wang | G06F 12/0246 711/1 |
| 2012/0221774 A1* | 8/2012 | Atkisson | G06F 12/0802 711/103 |
| 2014/0229658 A1* | 8/2014 | Maharana | G06F 12/0866 711/103 |

* cited by examiner

ADAPTIVE CACHE MEMORY CONTROLLER

CROSS-REFERENCE TO RELATED APPLICATIONS

This application claims the benefit of U.S. Provisional Application No. 61/839,085, filed on Jun. 25, 2013. The entire disclosure of the application referenced above is incorporated herein by reference.

FIELD

The present disclosure relates generally to cache memories and more particularly to adaptive cache memory controllers.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, data requested by a processor is initially read from a storage device (e.g., a disk drive) and is stored in a system memory (also called main memory, typically DRAM) used by the processor. The processor then reads the data from the system memory via a system bus to which the processor, the system memory, and other peripherals are connected, and processes the data. Processing the data in this manner can be slow.

Instead, data frequently used by the processor can be stored in cache memories. This process is called caching, and data stored in cache memories is called cached data. The processor can access and process cached data faster than the data stored in the disk drive or the system memory. Accordingly, cache memories can improve system performance and throughput.

Specifically, a cache controller stores the data frequently used by the processor in a cache memory. The cache memory is generally faster than the system memory and may be coupled to the processor by a bus separate from the system bus. Accordingly, the processor can access the data in the cache memory faster than the data stored in the system memory. Caching the data therefore improves system performance and throughput.

SUMMARY

A system comprises a partitioning module and a writing module. The partitioning module is configured to partition each of a plurality of solid-state disks into a plurality of blocks. Each of the plurality of blocks has a predetermined size. The writing module is configured to write data to one or more of the plurality of solid-state disks in a sequence starting from a first block of a first solid-state disk of the plurality of solid-state disks to a first block of a last solid-state disk of the plurality of solid-state disks, and subsequently starting from a second block of the first solid-state disk to a second block of the last solid-state disk. In each of each of the plurality of the plurality of solid-state disks, the second block is subsequent to the first block.

In other features, the system further comprises a dividing module configured to divide the data into a plurality of portions. The writing module is configured to write the plurality of portions respectively to the plurality of blocks in the sequence.

In another feature, in response to the data being not stored in a memory external to the plurality of solid-state disks, the writing module is configured to write the data and a copy of the data in two consecutive blocks in the sequence.

In another feature, the system further comprises an erasing module configured to erase one or more consecutive blocks in the sequence in response to a number of blocks available for writing in the plurality of solid-state disks decreasing to a predetermined threshold, and in response to the data written in the one or more consecutive blocks in the sequence being stored in a memory external to the plurality of solid-state disks.

In another feature, the system further comprises an erasing module configured to erase one or more consecutive blocks in the sequence in response to the data written in the one or more consecutive blocks in the sequence being stored in a memory external to the plurality of solid-state disks, and in response to the data written in the one or more consecutive blocks in the sequence being used at a frequency less than or equal to a predetermined frequency.

In other features, the system further comprises a selection module and an erasing module. The selection module is configured to select two consecutive blocks in the sequence in which the data and a copy of the data is written in response to the data being not stored in a memory external to the plurality of solid-state disk. The erasing module is configured to erase the two consecutive blocks. The selection module is configured to select the two consecutive blocks in response to a number of blocks available for writing in the plurality of solid-state disks decreasing to a predetermined threshold. The writing module is configured to write the data from the two consecutive blocks respectively to two consecutive available blocks in the sequence prior to the erasing module erasing the two consecutive blocks. The two consecutive available blocks are subsequent to a last written block in the sequence.

In other features, the system further comprises nonvolatile memory and an updating module. The nonvolatile memory is configured to store metadata received with the data. The nonvolatile memory is separate from the plurality of solid-state disks. The updating module is configured to update the metadata in response to the writing module writing the data from the two consecutive blocks respectively to the two consecutive available blocks in the sequence.

In other features, the system further comprises a selection module and an erasing module. The selection module is configured to select one or more consecutive blocks in the sequence in response to the data written in one or more blocks in the sequence being used at a frequency greater than or equal to a predetermined frequency. The erasing module is configured to erase the one or more consecutive blocks. The writing module is configured to write the data from the one or more consecutive blocks respectively to one or more consecutive available blocks in the sequence. The one or more consecutive available blocks are subsequent to a last written block in the sequence.

In other features, the system further comprises nonvolatile memory and an updating module. The nonvolatile memory is configured to store metadata received with the data. The nonvolatile memory is separate from the plurality of solid-state disks. The updating module is configured to update the metadata in response to the writing module writing the data from the one or more consecutive blocks respectively to one or more consecutive available blocks in the sequence.

In other features, the system further comprises a removal module and an exclusion module. The removal module is configured to remove one of the plurality of solid-state disks. The exclusion module is configured to exclude from the sequence blocks associated with the removed solid-state disk.

In other features, the system further comprises an adding module and an inclusion module. The adding module is configured to add an additional solid-state disk to the plurality of solid-state disks. The partitioning module is configured to partition the additional solid-state disk into a plurality of additional blocks. The inclusion module is configured to include the plurality of additional blocks in the sequence.

In still other features, a method comprises dividing each of a plurality of solid-state disks into a plurality of blocks, where each of the plurality of blocks has a predetermined size. The method further comprises writing data to one or more of the plurality of solid-state disks in a sequence starting from a first block of a first solid-state disk of the plurality of solid-state disks to a first block of a last solid-state disk of the plurality of solid-state disks, followed by starting from a second block of the first solid-state disk to a second block of the last solid-state disk. In each of the plurality of solid-state disks, the second block is subsequent to the first block.

In other features, the method further comprises dividing the data into a plurality of portions, and writing the plurality of portions respectively to the plurality of blocks in the sequence.

In another feature, the method further comprises in response to the data being not stored in a memory external to the plurality of solid-state disks, writing the data and a copy of the data in two consecutive blocks in the sequence.

In another feature, the method further comprises erasing the one or more consecutive blocks in the sequence in response to a number of blocks available for writing in the plurality of solid-state disks decreasing to a predetermined threshold, and in response to the data written in one or more consecutive blocks in the sequence being stored in a memory external to the plurality of solid-state disks.

In another feature, the method further comprises erasing the one or more consecutive blocks in the sequence in response to the data written in one or more blocks in the sequence being stored in a memory external to the plurality of solid-state disks, and in response to the data written in one or more consecutive blocks in the sequence being used at a frequency less than or equal to a predetermined frequency.

In other features, the method further comprises in response to a number of blocks available for writing in the plurality of solid-state disks decreasing to a predetermined threshold, and in response to the data written in one or more blocks in the sequence being not stored in a memory external to the plurality of solid-state disks: selecting two consecutive blocks in the sequence in which the data and a copy of the data is written; writing the data from the two consecutive blocks respectively to two consecutive available blocks in the sequence, where the two consecutive available blocks are subsequent to a last written block in the sequence; and erasing the two consecutive blocks.

In other features, the method further comprises storing metadata received with the data, and updating the metadata in response to writing the data from the two consecutive blocks respectively to the two consecutive available blocks in the sequence.

In other features, the method further comprises in response to the data written in one or more blocks in the sequence being used at a frequency greater than or equal to a predetermined frequency: selecting one or more consecutive blocks in the sequence; writing the data from the one or more consecutive blocks respectively to one or more consecutive available blocks in the sequence, where the one or more consecutive available blocks are subsequent to a last written block in the sequence; and erasing the one or more consecutive blocks.

In other features, the method further comprises storing metadata received with the data, and updating the metadata in response to writing the data from the one or more consecutive blocks respectively to one or more consecutive available blocks in the sequence.

In other features, the method further comprises removing one of the plurality of solid-state disks, and excluding from the sequence blocks associated with the removed solid-state disk.

In other features, the method further comprises adding an additional solid-state disk to the plurality of solid-state disks, partitioning the additional solid-state disk into a plurality of additional blocks, and including the plurality of additional blocks in the sequence.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
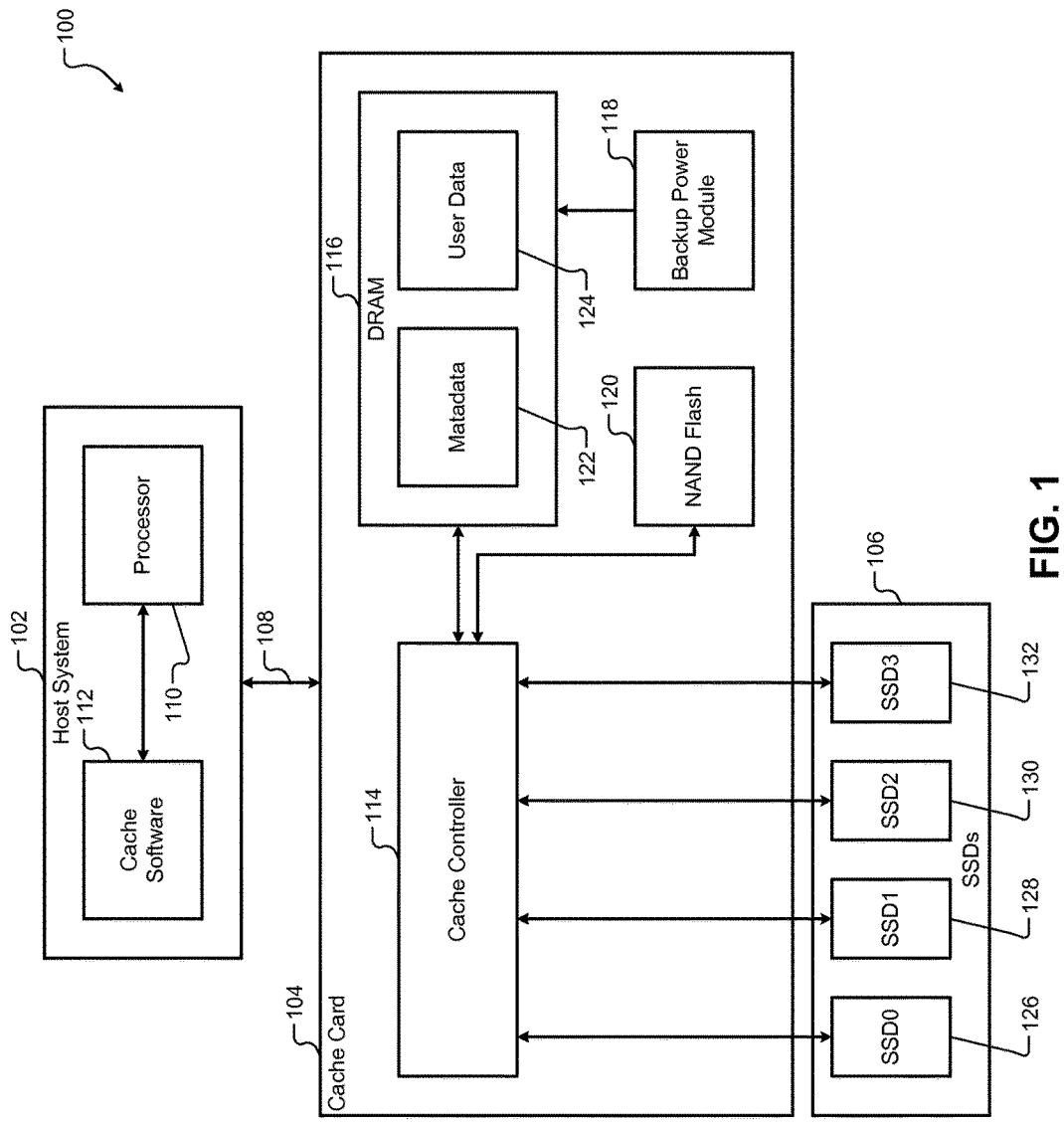
FIG. 1 is a functional block diagram of a caching system.

Using solid-state disks (SSDs) as cache memory can improve system performance and throughput. The systems and methods of the present disclosure provide a SSD-based cache memory and caching system. The caching system has the following characteristics: The caching system writes data in a log-structured manner (sequentially within each SSD and striped across all SSDs) for optimal performance. The read/write throughput of the caching system scales with the number of SSDs. The caching system ensures that there is no single point of failure for dirty data (data stored only in cache memory and not stored in any other storage (e.g., system memory or disk)). The caching system allows for growing/shrinking the storage capacity of the cache memory in an online manner without affecting the data cached in the existing SSDs. The caching system provides efficient garbage collection to reclaim space within the cache memory.

Specifically, as explained below in detail, the SSDs are grouped into logical entities called containers. Each container contains one or more SSDs. Containers providing storage for dirty data include at least two SSDs to provide reliability. Two or more copies of dirty data are stored on two or more SSDs within each container so that the dirty data is not lost if one SSD fails. A container is a data structure that maintains a chain of disk structures corresponding to the SSDs. Each disk structure of an SSD includes book-keeping information and a link to a reverse lookup table used to update metadata when data is moved within the SSDs to reclaim space during garbage collection. In a container, each SSD is divided into a plurality of fixed-size blocks. Data is written to these blocks in a sequential manner within each SSD and in a striped manner across all the SSDs. When data to be written (cached) is received, the data may be divided into a plurality of portions. The portions are written in these blocks in the sequential manner within each SSD and in the striped manner across all the SSDs. Dirty data is copied and written in at least two separate SSDs. During garbage collection, data is moved as follows. Infrequently used clean data (i.e., data of which a copy is stored in the SSDs and in some other storage (e.g., system memory or disk)) is evicted from the SSDs. Dirty data and frequently used clean data are moved to first available free blocks within the container. The moved data is written in the available free blocks in the same manner: sequentially within each SSD and striped across all the SSDs. After moving the data, the blocks freed up by moving the data is erased and released for reuse, and metadata is updated.

This scheme provides many advantages. For example, this scheme provides striping and RAID1 benefits at the same time. This scheme also ensures that blocks are consumed in a sequential (log-structured) manner, which minimizes garbage collection. This scheme utilizes a fixed-size table per SSD to store a cookie representing meta-data entry providing fast reverse lookup. Further, this scheme also allows adding/removing SSDs to/from a container in an online manner (i.e., without affecting the existing cached data) and ensures that blocks are still consumed in log-structured manner after the container is reconfigured upon adding and removing SSDs.

FIG. 1 shows a caching system 100 comprising a host system 102, a cache card 104, and a plurality of SSDs 106. The host system 102 communicates with the cache card 104 via a PCIe interface, for example. The host system 102 comprises a processor 110. The processor 110 executes cache software 112 and communicates with the cache card 104. The cache card 104 uses the SSDs 106 as cache memory and caches data to the SSDs 106 according to commands received from the cache software 112.

The cache card comprises a cache controller 114, a DRAM 116, a backup power module 118, and NAND flash 120. The DRAM 116 stores metadata 122 related to the cache controller 114 and user data 124 received from the host system 102. The DRAM 116 is rendered nonvolatile by the backup power module 118, which maintains power supply to the DRAM 116 when power supply to the caching system 100 is turned off. The NAND flash 120 may also be used to store the metadata 122 related to the cache controller 114.

The SSDs 106 include two or more SSDs. In the example shown, the SSDs 106 include four SSDs: SSD0 126, SSD1 128, SSD2 130, and SSD3 132. A group of the SSDs 106 is called a container. A number of SSDs in the container depends on a user selectable parameter called a replication factor. The replication factor indicates a number of copies of dirty data to be stored in the SSDs 106. For example, the replication factor is one if a user wants to store only one copy of dirty data on an SSD. The replication factor is two if the user wants to store two copies of dirty data on two different SSDs, and so on.

In general, the replication factor is equal to the number of copies of dirty data to be stored in the SSDs 106, and the number of SSDs in the container is equal to the replication factor. To provide protection against loss of dirty data, the replication factor and the number of SSDs in the container must be at least equal to two. When the replication factor is two, the dirty data and its copy are stored on two different SSDs in the container. The dirty data is not lost if one of the two SSDs in the container fails.

This scheme prevents loss of dirty data if a single SSD fails. To protect the dirty data from multiple SSD failures, in addition to the number of SSDs dictated by the replication factor, one additional SSD must be added to provide for each additional SSD failure. For example, for a single SSD failure, the number of SSDs is two for a replication factor of two. To accommodate two SSD failures, the number of SSDs must be three for a replication factor of two, and so on.

The user may initially set the replication factor to one value and may later set the replication factor to another value. For example, the user may change the replication factor upon removing one or more SSDs from the container or upon adding one or more SSDs to the container.

Figure 2:
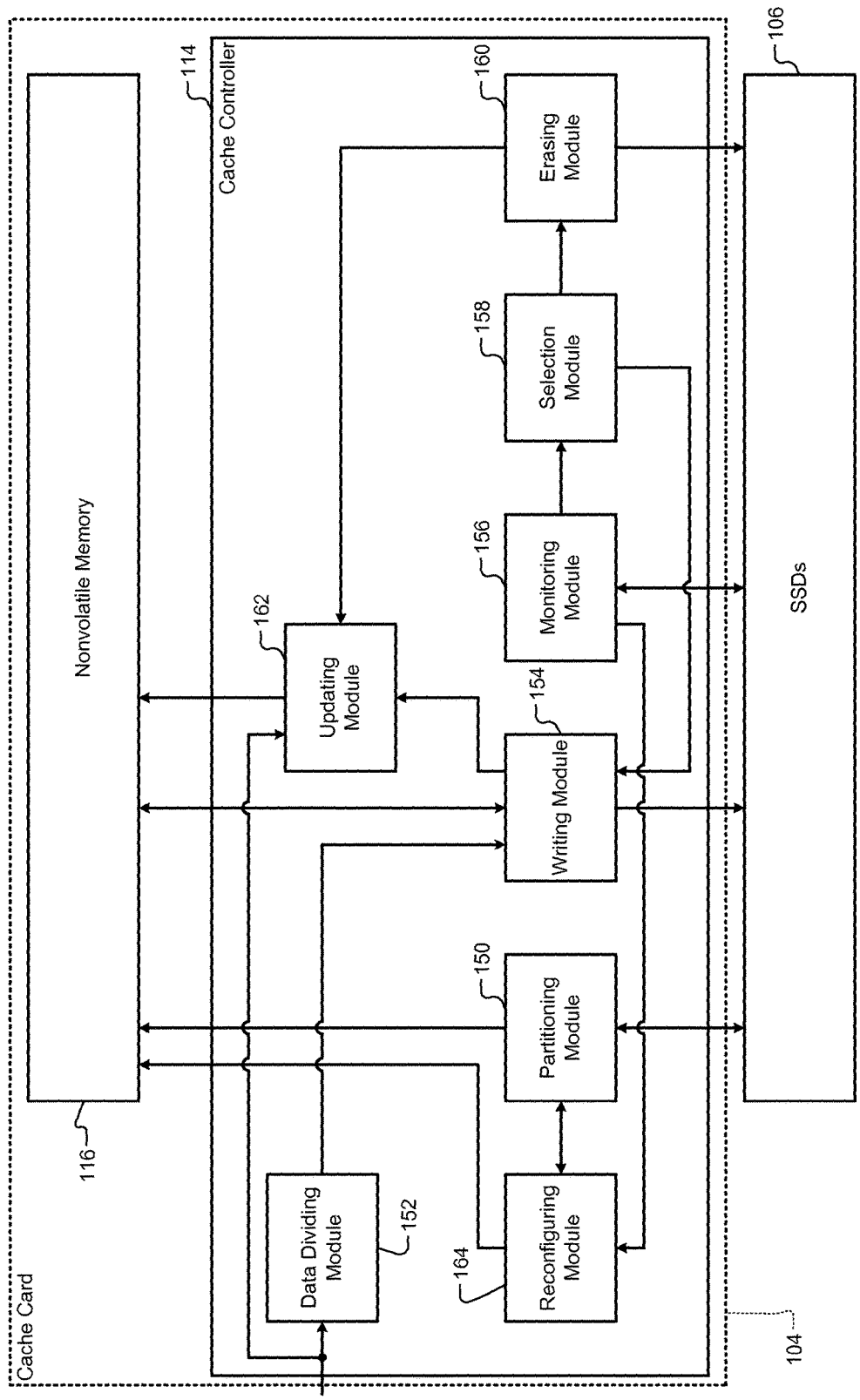
FIG. 2 is a functional block diagram of a cache card used in the caching system of FIG. 1.

FIG. 2 shows the cache card 104 in further detail. The DRAM 116, which is rendered nonvolatile by the backup power module 118, is shown as nonvolatile memory 116. The cache controller 114 comprises a partitioning module 150, a data dividing module 152, a writing module 154, a monitoring module 156, a selection module 158, an erasing module 160, an updating module 162, and a reconfiguring module 164.

The partitioning module 150 logically partitions each SSD in the container into fixed-size blocks called extents. The number of fixed-size blocks is user selectable and is a function of a capacity of each SSD and a size of each extent.

When data to be cached is received, one or more extents are allocated to write the data in one or more SSDs 106 as explained below in further detail.

Figure 3:
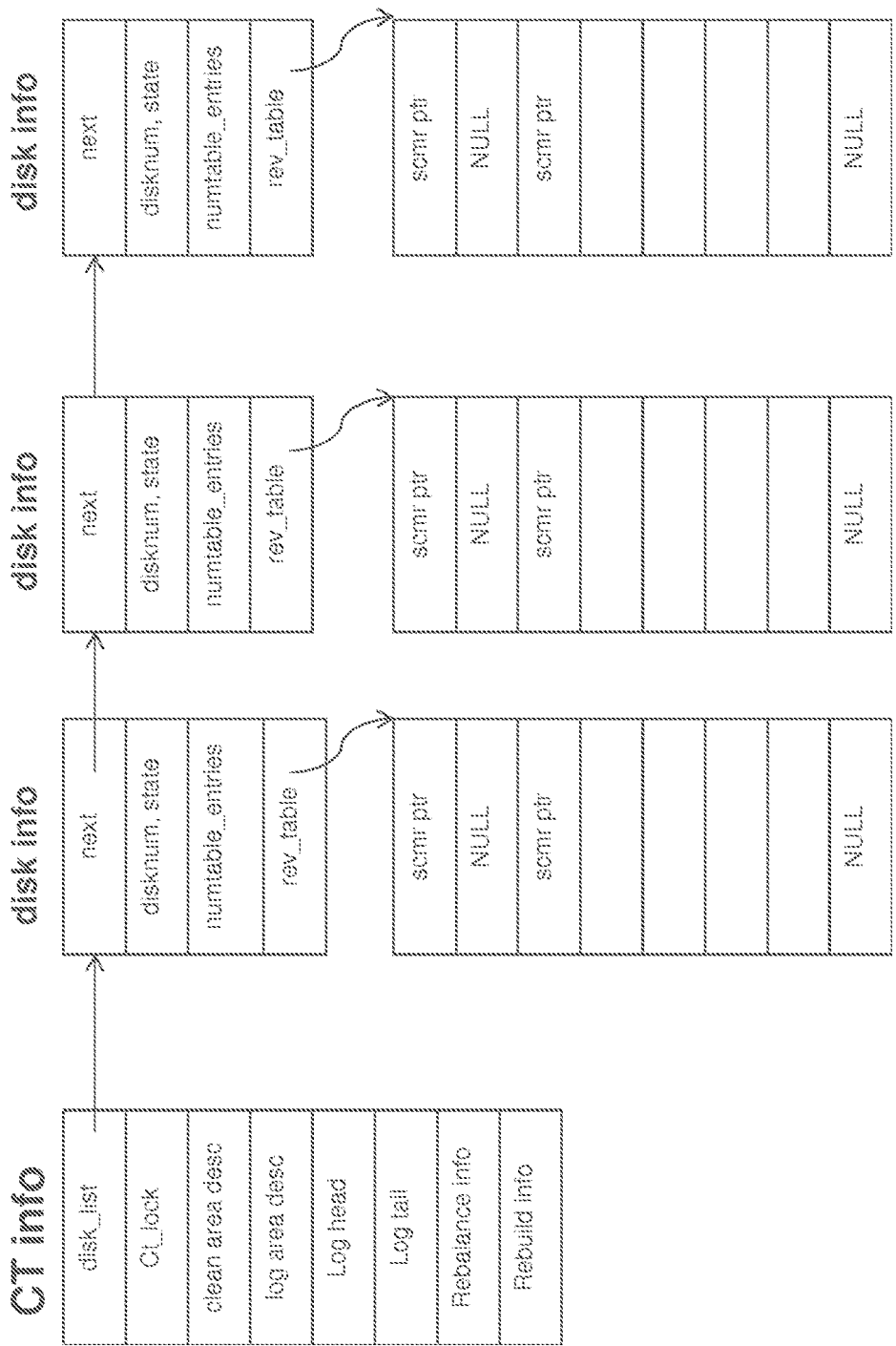
FIG. 3 depicts a data structure of a container comprising a plurality of solid-state disks used in the caching system of FIG. 1.

FIG. 3 shows an example of data structures generated by the partitioning module 150 for a container formed by the SSDs 106. For example, a data structure called CT info (container information) includes the following fields: a list of SSDs (disk_list), a status parameter called Ct_lock used during I/O operations, a clean area description indicating free space in the container, a log area description (a log being a set of blocks consumed sequentially and in striped manner to store data in the container), a log head, a log tail, a rebalance information (e.g., following garbage collection), and rebuild information (e.g., after removing/adding an SSD). Additional data structures include disk information of each SSD. For example, for each SSD, the disk information includes a disk number (device ID) of the SSD, a state of the SSD (e.g., online, offline, etc.), entries indicating where to begin writing data, and other information. These data structures are stored in the nonvolatile memory 116 or the NAND flash 120. Alternatively, these data structures can be stored anywhere in the caching system 100 (e.g., in system memory), provided that the data structures are stored in a nonvolatile manner.

The data dividing module 152 divides data received from the host system 102 into a plurality of portions. The number of portions is a function of the size of the data received and the number of SSDs in the container. For example, a 12 Kb block of data received from the host system 102 may be divided into three portions of 4 Kb each if the SSDs 106 include three SSDs. Alternatively, the number of portions can be a function of the size of the data received and the size of the extents (fixed-size blocks in the container).

Figure 4:
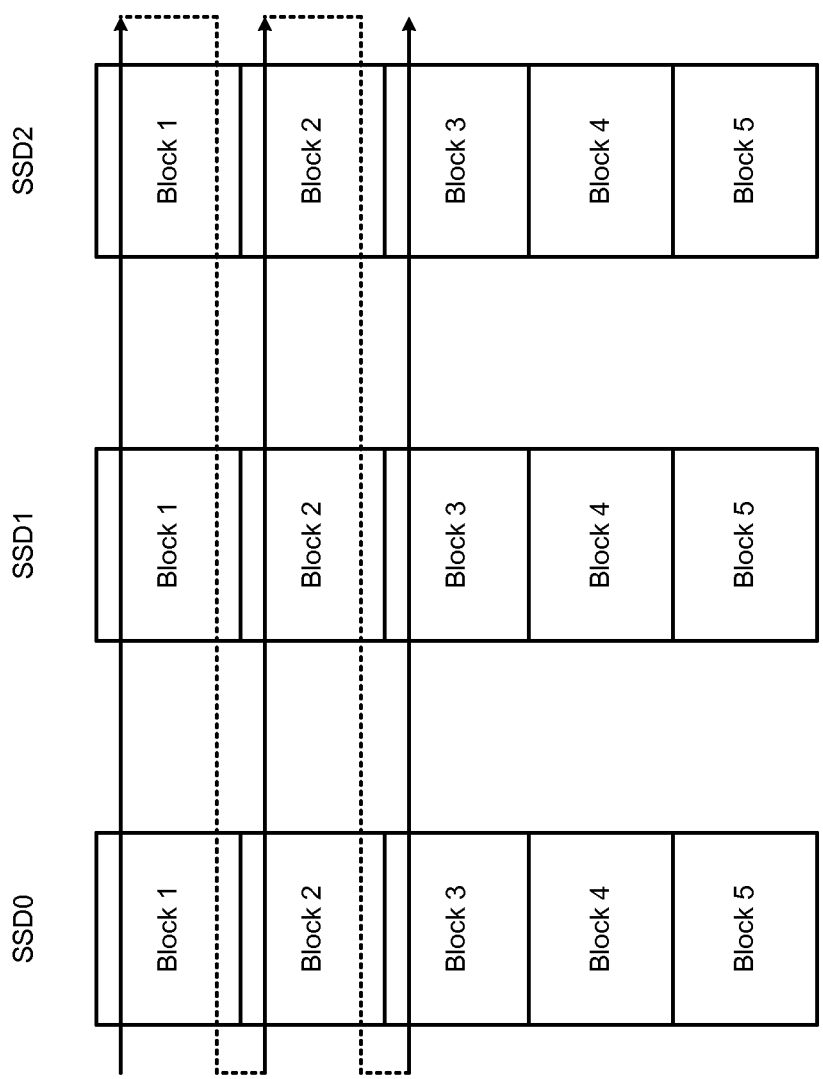
FIG. 4 depicts a sequential and striped manner of writing data in the container comprising the plurality of solid-state disks used in the caching system of FIG. 1.

FIG. 4 shows the manner in which the writing module 154 writes the data in the SSDs 106 in the container. Specifically, the writing module 154 writes the data sequentially within each SSD and by striping across all of the SSDs as shown. The writing module 154 determines where to begin writing data as explained below.

Figure 5:
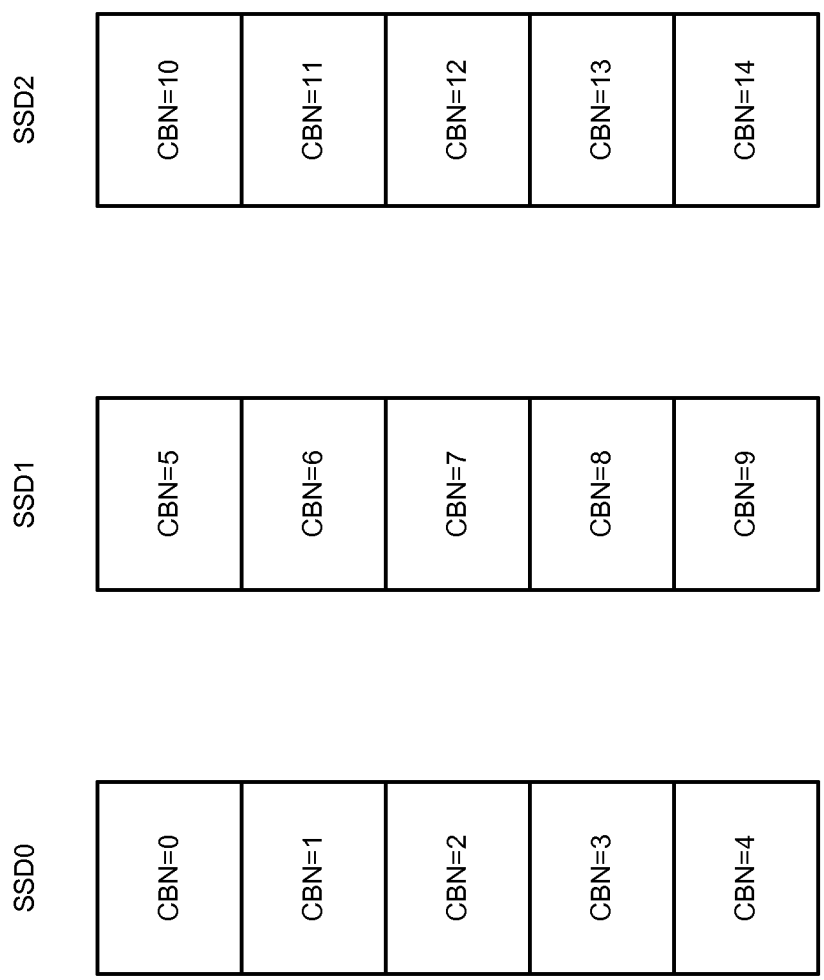
FIG. 5 depicts sequencing of blocks of the plurality of solid-state disks in the container used in the caching system of FIG. 1.

FIG. 5 shows an example of a container comprising three SSDs. The SSDs are divided into fixed-size blocks having container block numbers (CBNs). The CBNs are assigned numbers in a sequentially increasing order as shown: starting from CBN0 from a first block of the first SSD SSD0 to a last block of the last SSD, which is the third SSD SSD2 in the example shown.

When writing data to the SSDs 106, the writing module 154 determines where to write the data as follows. The SSD number is calculated using the formula SSD_number=CBN/Number_of_blocks_per_SSD. An SSD block offset is calculated using the formula SSD_block_offset=CBN mod Number_of_blocks_per_SSD. A next CBN to which to write data is calculated as follows. Next_CBN=Last_CBN_written+Number_of_blocks_per_SSD. If Next_CBN> (Num_of_disks_in_container*Number_of_blocks_per_SSD), Next_CBN=((Next_CBN mod Number_of_blocks_per_SSD)+1) mod Number_of_blocks_per_SSD.

Figure 6:
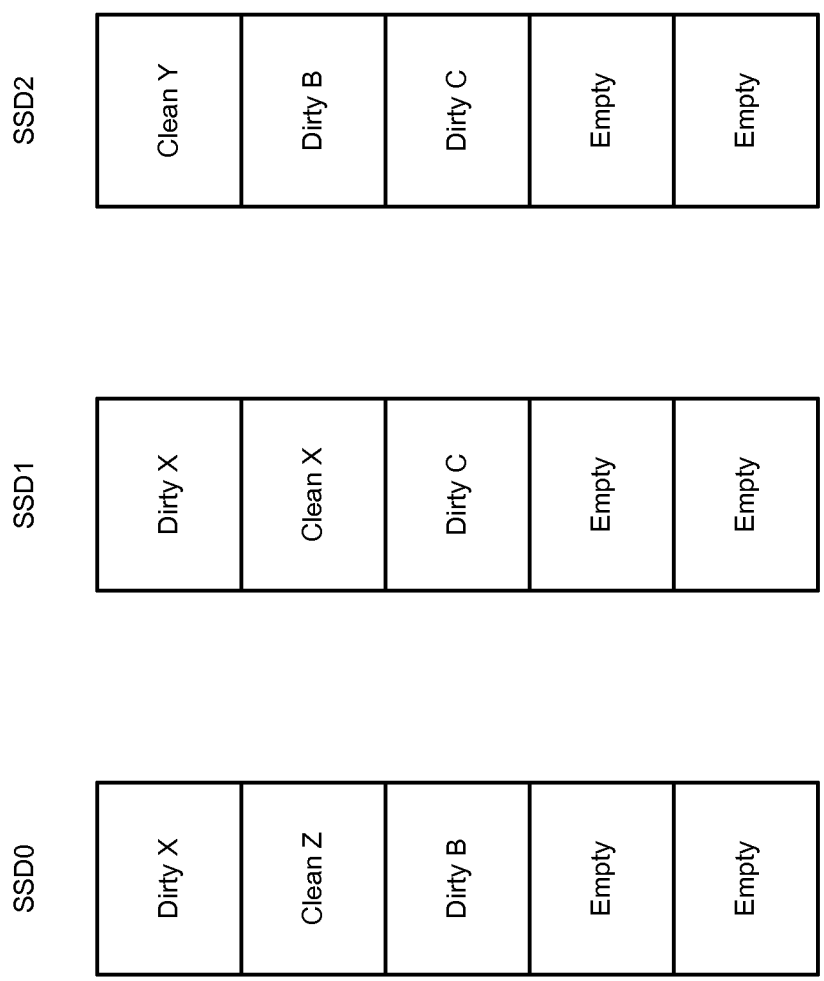
FIG. 6 depicts an example of writing different types of data in the sequential and striped manner in the container comprising the plurality of solid-state disks used in the caching system of FIG. 1.

FIG. 6 shows an example of writing dirty data. For example, with a replication factor of two, the writing module 154 writes dirty data X in a first block of SSD0 and writes a copy of the dirty data X in a first block of SSD1. The dirty data is also written sequentially within each SSD and striped across two or more SSDs. Additional examples of writing dirty data on different SSDs are also shown.

Figure 7:
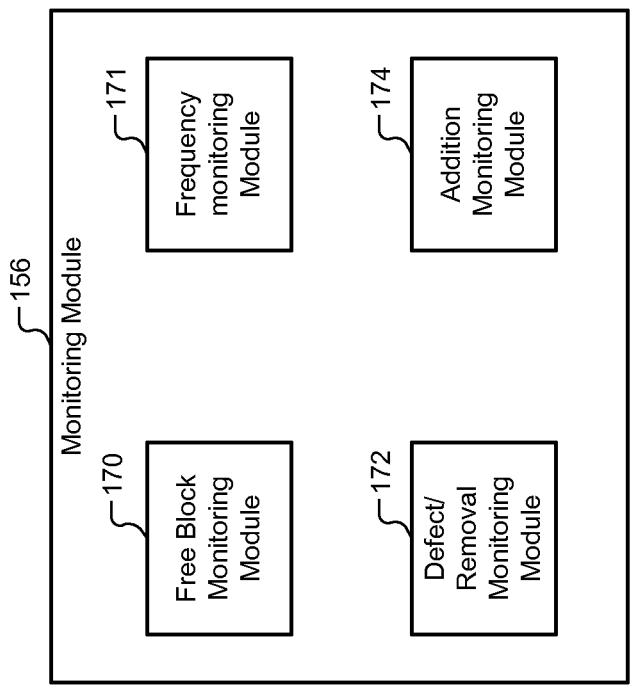
FIG. 7 depicts a monitoring module used by a cache controller in the cache card of FIG. 2.

FIG. 7 shows an example of the monitoring module 156. The monitoring module 156 monitors usage of the SSDs 106. The monitoring module 156 may include a free block monitoring module 170, a frequency monitoring module 171, a defect/removal monitoring module 172, and an addition monitoring module 174. The free block monitoring module 170 may monitor the number of free blocks available in the container. For example, when the number of free blocks available for writing data in the container falls below a predetermined threshold level, the monitoring module 156 may generate a control signal to trigger garbage collection. The selection module 158 and an erasing module 160 perform garbage collection as described below.

The frequency monitoring module 171 monitors a frequency at which some of the data cached in the container is used by the host system 102. The frequency monitoring module 171 provides the frequency information to the selection module 158. Based on the frequency information, the selection module 158 and an erasing module 160 perform garbage collection as described below.

The defect/removal monitoring module 172 monitors errors in the SSDs 106 and monitors whether any of the SSDs 106 is defective. A user may remove a defective SSD and optionally replace the defective SSD with another SSD without affecting the data cached in the SSDs 106. Alternatively, the user may remove an SSD regardless of whether the SSD is defective and may replace the removed SSD with another SSD without affecting the data cached in the SSDs 106. The defect/removal monitoring module 172 monitors these events and generates control signals to indicate the events. Based on the control signals, the reconfiguring module 164 reconfigures the container based on removal/replacement of an SSD as described below.

The addition monitoring module 174 monitors whether an SSD has been added. If an addition of an SSD is detected, the addition monitoring module 174 generates a control signal. Based on the control signal, the reconfiguring module 164 reconfigures the container as described below.

During garbage collection, based on the information received from the monitoring module 156, the selection module 158 selects one or more blocks in the SSDs 106 where clean data is stored if the clean data is used at a frequency less than or equal to a predetermined frequency. The erasing module 160 erases the selected blocks. The updating module 162 updates the metadata stored in the nonvolatile memory 116 to indicate which blocks are freed.

Additionally, the selection module 158 selects blocks in the SSDs 106 where dirty data is stored and where clean data is stored if the clean data is used at a frequency greater than or equal to a predetermined frequency. The writing module 154 moves the data from the selected blocks to first available free blocks in the container. The writing module 154 writes the data in the free blocks in the same manner: sequentially within each SSD and striped across all of the SSDs. The erasing module 160 erases the selected blocks. The updating module 162 updates the metadata stored in the nonvolatile memory 116 to indicate which blocks are freed and which blocks now store the moved data.

Figure 8:
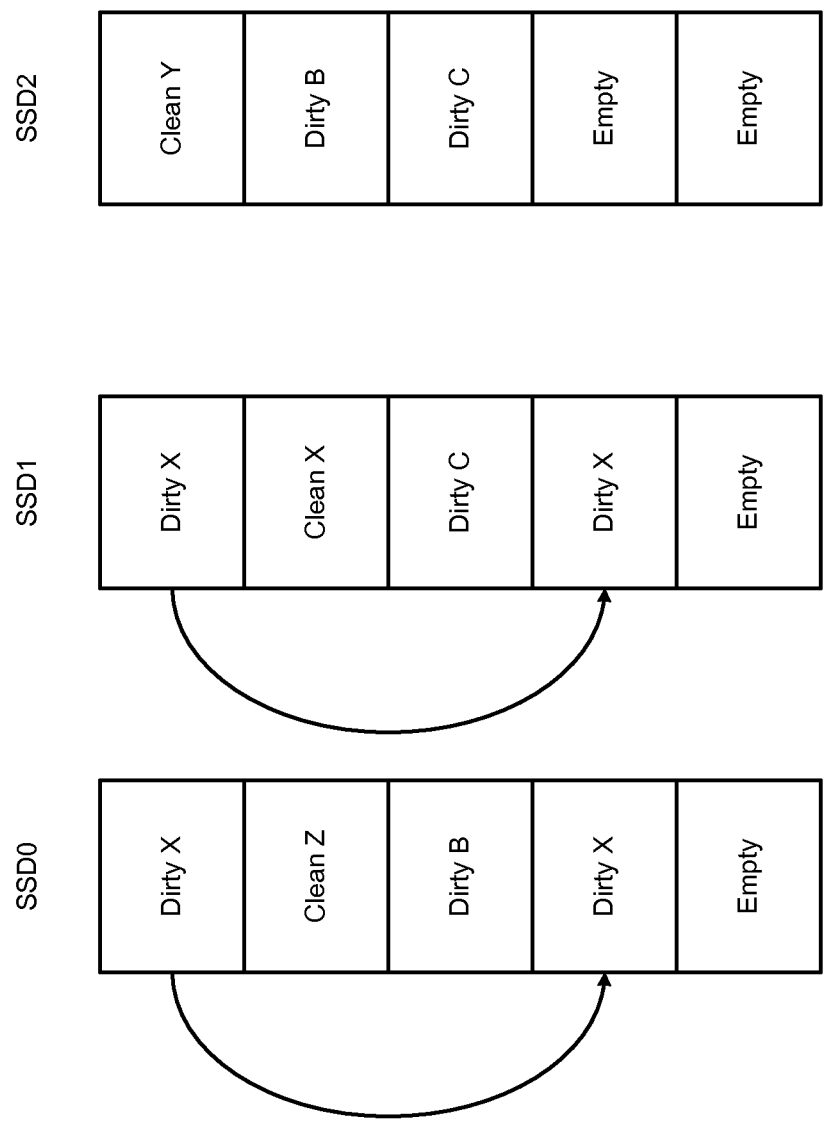
FIG. 8 depicts an example of relocating a type of data within the container comprising the plurality of solid-state disks used in the caching system of FIG. 1.

FIG. 8 shows an example of moving dirty data. For example, the dirty data X can be moved as shown, and the blocks originally storing the dirty data X can be erased and released for reuse. Additionally, the clean data Y, Z, and X can be evicted if used infrequently, and the blocks storing the clean data Y, Z, and X can be erased and released for reuse. Alternatively, if the clean data Y, Z, and X is frequently used, the clean data Y, Z, and X can be moved to the blocks marked empty in the container (written sequentially and in striped manner), and the blocks originally storing the clean data Y, Z, and X can be erased and released for reuse.

A cache metadata lookup table is maintained in the nonvolatile memory 116. The cache metadata lookup table includes metadata entries that map storage device data block numbers (called logical block addresses or LBAs assigned by the host system 102) to the CBNs. A reverse metadata lookup table maps the CBNs to the metadata entries. The metadata entries also keep track of the state of data stored in the CBNs. For example, the state of a CBN may indicate whether the data stored in the CBN are clean, dirty, being moved, and so on.

When the host system 102 supplies the data to be cached to the cache card 104, the host system 102 also supplies a cookie along with the data to be cached. The cookie includes metadata related to the data to be cached maintained by the cache software 112. A chain of reverse lookup tables, one table per SSD, describing the disk block numbers and index in the metadata table is maintained in the nonvolatile memory 116.

The updating module 162 updates the cookie each time data is written or moved within the container (e.g., during garbage collection, or when the container is reconfigured due to an SSD being removed/added). The cache software 112 updates its metadata based on the updated cookie. This mechanism allows the cache controller 114 to easily interface with different cache software on the host system 102 and vice a versa.

Figure 9:
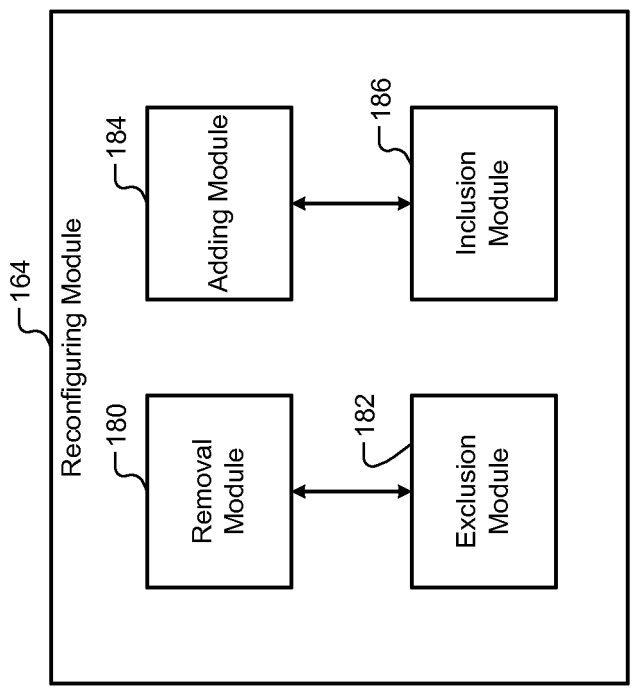
FIG. 9 depicts a reconfiguring module used by the cache controller in the cache card of FIG. 2.

FIG. 9 shows an example of the reconfiguring module 164. The reconfiguring module 164 comprises a removal module 180, and exclusion module 182, an adding module 184, and an inclusion module 186. The removal module 180 removes an SSD, which is deemed defective or removed by the user, from the container data structure. The exclusion module 182 excludes blocks associated with the removed SSD from the data structure data structure stored in the nonvolatile memory 116. The adding module 184 adds an SSD, which is added by the user, to the container data structure stored in the nonvolatile memory 116. Specifically, the partitioning module 150 partitions the added SSD and to fixed-size blocks. The inclusion module 186 includes the additional blocks to the data structure data structure stored in the nonvolatile memory 116.

Throughout the present disclosure, the addition or removal of an SSD described may include a physical addition or removal of the SSD. Alternatively, the added SSD may be already physically present, and the adding module 184 may simply logically add the additional SSD to the container. Similarly, the removed SSD may remain physically present, and the removal module 180 may simply logically remove the removed SSD from the container.

Figure 10:
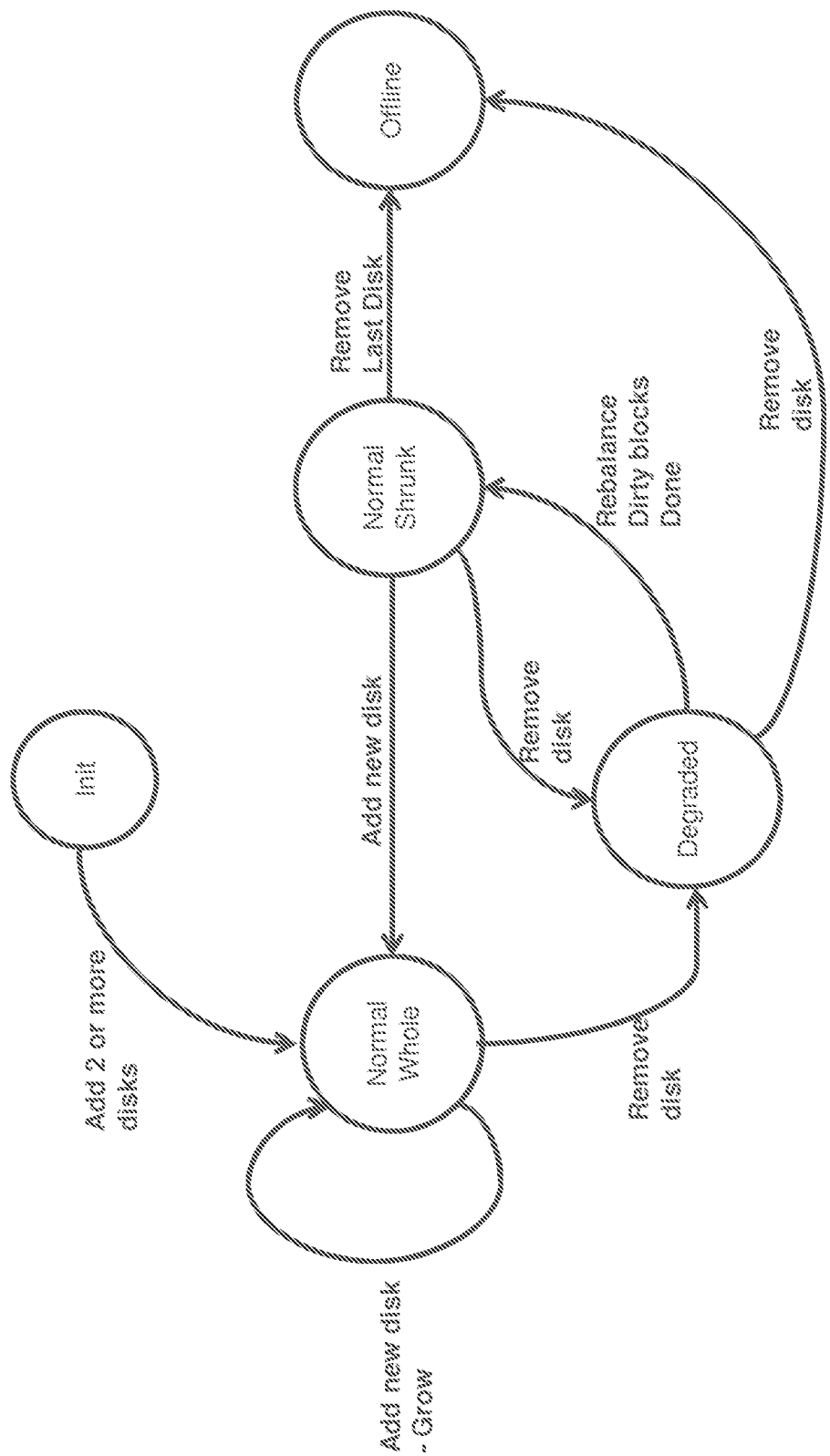
FIG. 10 depicts a state machine used by the cache controller in the cache card of FIG. 2.

FIG. 10 shows a state machine of the container. In an initial (Init) state, two or more SSDs are added to form a container. The state machine moves to a Normal Whole state where all the SSDs are functioning properly. In the Normal Whole state, one or more new SSDs can be added to the container. The state machine moves from the Normal Whole state to a Degraded state if an SSD is removed from the container (e.g., due to the SSD being defective or unnecessary, or the user deciding to replace the SSD). From the Degraded state, the state machine can move to an off-line state if the removed SSD is a last SSD in the container. Alternatively, the state machine can move from the Degraded state to a Normal Shrunk state by performing a rebalancing operation after an SSD is removed from the container. From the Normal Shrunk state, the state machine can move to the off-line state if the last SSD is removed from the container. Alternatively, the state machine can move from Normal Shrunk state to the Degraded state if an SSD is removed from the container. Alternatively, the state machine can move from the Normal Shrunk state to the Normal Whole state if a new SSD is added to the container.

Figure 11:
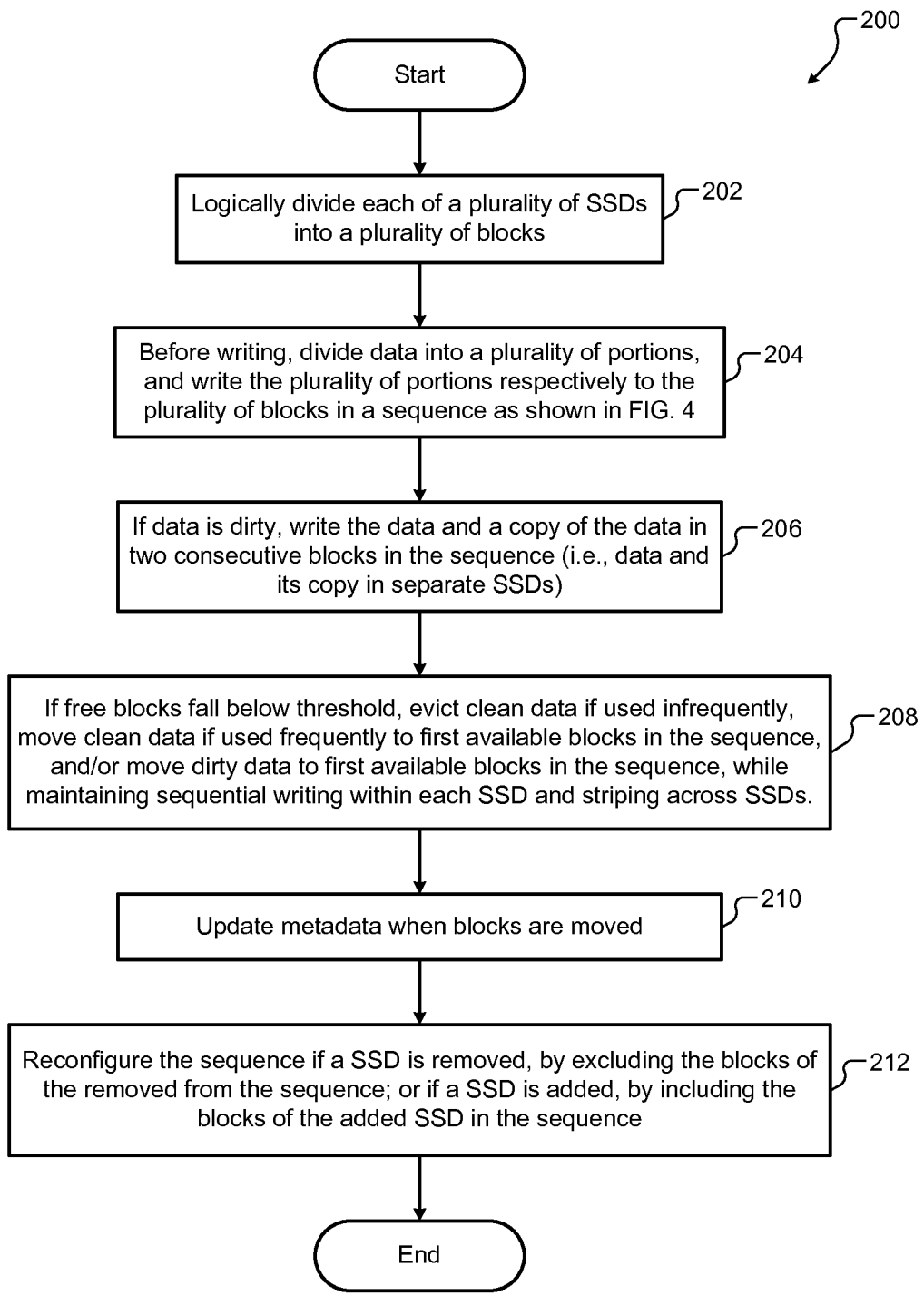
FIG. 11 is a flowchart of a method for writing data in the sequential and striped manner in the container comprising the plurality of solid-state disks used in the caching system of FIG. 1.

FIG. 11 shows a flowchart of a method 200 for caching data. At 202, control logically divides each of a plurality of SSDs in a container into a plurality of fixed-size blocks. At 204, control divides data to be cached into a plurality of portions, and writes the plurality of portions respectively to the plurality of blocks in a sequence shown in FIG. 4. At 206, if the data to be cached is dirty data, control writes the data and a copy of the data in two consecutive blocks in the sequence (i.e., the data and the copy of the data in separate adjacent SSDs) as shown in FIG. 4.

At 208, if the number of free blocks in the container decreases to a level below a predetermined threshold, control reclaims blocks as follows. Control evicts infrequently used clean data and erases the blocks containing the infrequently used clean data. Alternatively, if the clean data is used frequently, control moves the clean data to first available free blocks in the sequence in the container while maintaining sequential writing within each SSD and striping across all the SSDs. Control erases the blocks that originally stored the frequently used clean data. Alternatively or additionally, control moves dirty data to first available free blocks in the sequence in the container while maintaining sequential writing within each SSD and striping across all the SSDs. Control erases the blocks that originally stored the dirty data. At 210, control updates metadata when data is moved within the container.

At 212, if an SSD is removed, control reconfigures the original sequence of blocks in the container by excluding the blocks of the removed SSD from the sequence. Alternatively, if an SSD is added, control reconfigures the original sequence of blocks in the container by including the blocks of the added SSD in the sequence.

Figure 12:
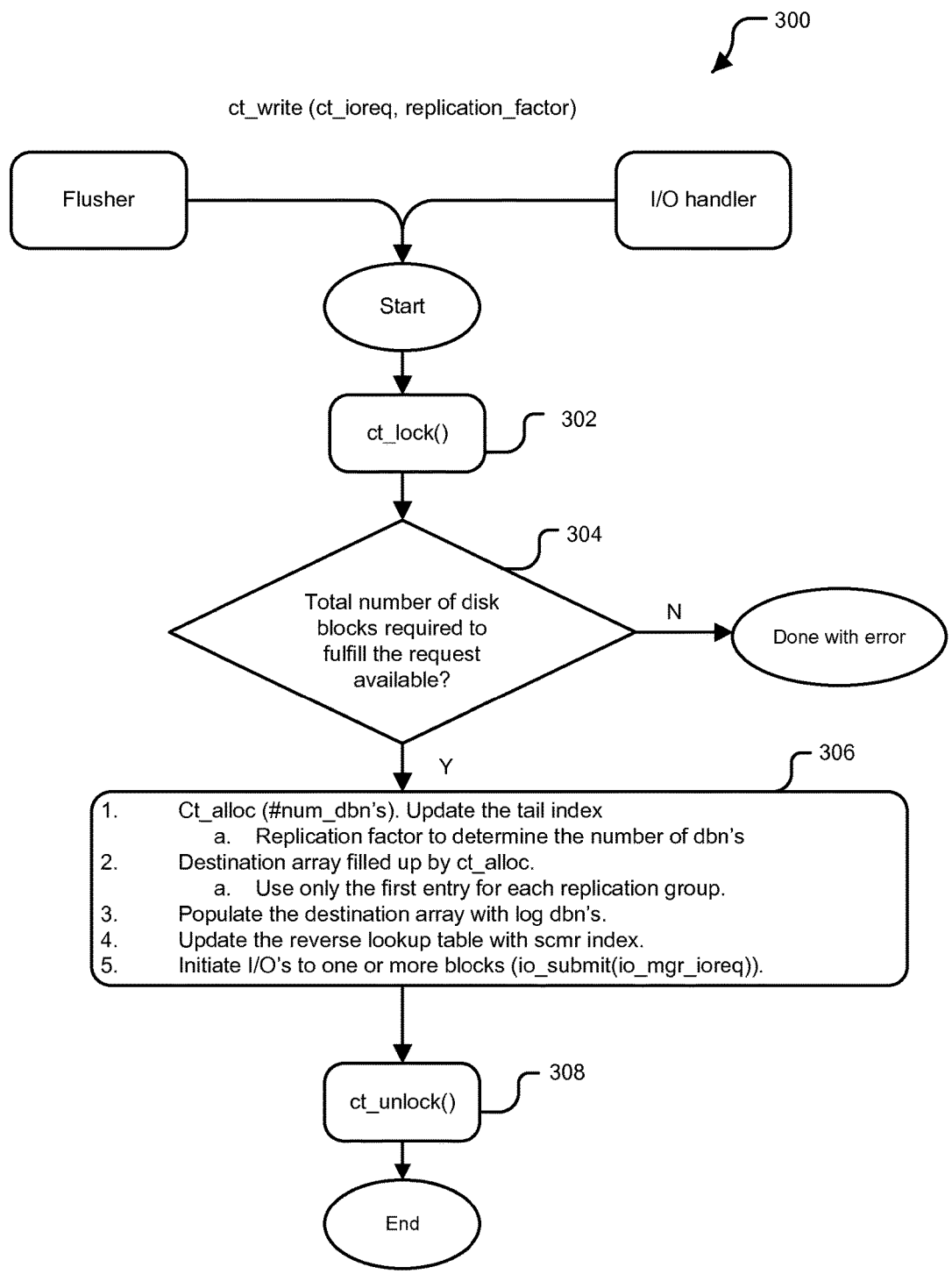
FIG. 12 is a flowchart of a method for writing data in the container comprising the plurality of solid-state disks used in the caching system of FIG. 1.

FIG. 12 shows a method 300 for writing data in the container. At 302, control locks (reserves) the container. At 304, control determines whether the total number of blocks available in the container is sufficient to fulfill the write request. The method 300 ends with an error if the total number of blocks available in the container is insufficient to fulfill the write request. At this point, the user can add an SSD to the container.

At 306, if the total number of blocks available in the container is sufficient to fulfill the write request, control performs the following actions. Control allocates a number of blocks and updates a tail index in the container data structure. The number of blocks allocated is a function of the replication factor. Control fills a destination array in the container data structure with the number of blocks allocated, using only first entry for each replication group. Control populates the destination array with the allocated block numbers. Control updates the reverse lookup table with an SCMR index, where SCMR denotes a Simple file-based Cache class for Mysql heavy Read query. Control initiates one or more I/O operations to one or more allocated blocks. At 308, control unlocks (releases) the container on completion of the I/O operations.

Figure 13:
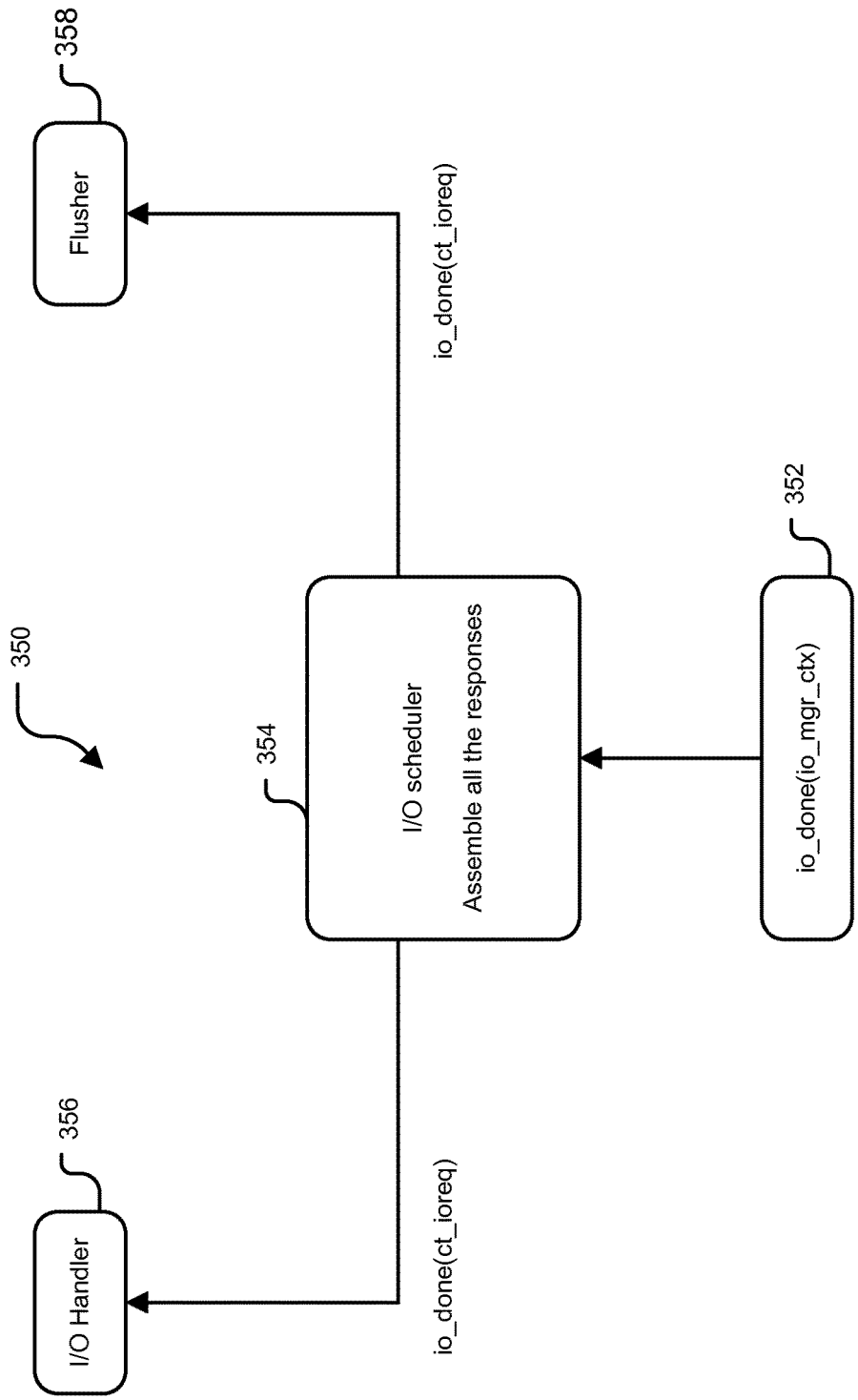
FIG. 13 is a flowchart of a method for scheduling I/O operations in the cache controller used in the cache card of FIG. 2.

FIG. 13 shows a method 350 performed by an I/O scheduler of the cache controller 114. At 352, the I/O scheduler receives an indication of an I/O operation (e.g., a write operation described with reference to FIG. 12) being completed. At 354, the I/O scheduler assembles all of the responses resulting from the completion of the I/O operation. At 356 and 358, the I/O scheduler sends an indication of completion of the I/O operation respectively to an I/O handler and/or a flusher of the cache controller 114.

Figure 14:
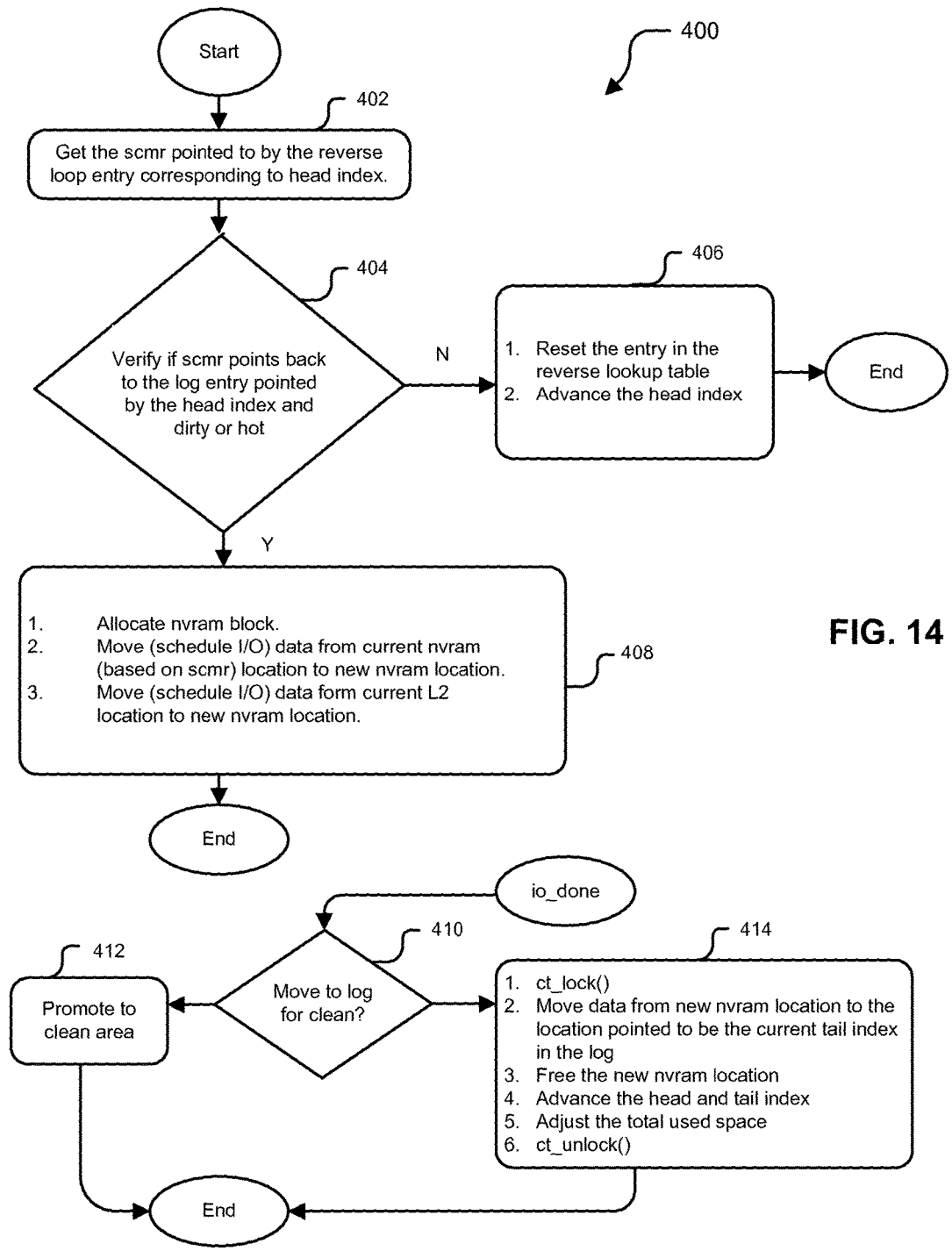
FIG. 14 is a flowchart of a method for relocating data from head to tail of a log in the container comprising the plurality of solid-state disks used in the caching system of FIG. 1.

FIG. 14 shows a method 400 for relocating data from head to tail of a log (sequence of blocks shown in FIG. 4) in the container. At 402, control gets the SCMR pointed to by the reverse lookup entry corresponding to a head index. At 404, control determines if the SCMR points back to a log entry pointed by the head index. At 406, if the SCMR does not point back to a log entry pointed by the head index, control resets the entry in the reverse lookup table and advances the head index. At 408, if the SCMR points back to a log entry pointed by the head index, control performs the following actions. Control allocates an NVRAM block. Control schedules an I/O operation to move data from a current NVRAM location (based on SCMR) to a new NVRAM location. Control schedules an I/O operation to move data from current cache location to the new NVRAM location.

At 410, when the scheduled I/O operations are completed, control determines whether to move the data to a clean area in the log. At 412, control moves the data to a clean area in the log. Alternatively, at 414, control performs the following actions. Control locks (i.e., reserves) the container. Container moves data from the new NVRAM location to the location pointed to be a current tail index in the log. Control frees the new NVRAM location. Control advances the head and tail indexes. Control adjusts the total used space. Control unlocks (i.e., releases) the container.

Figure 15:
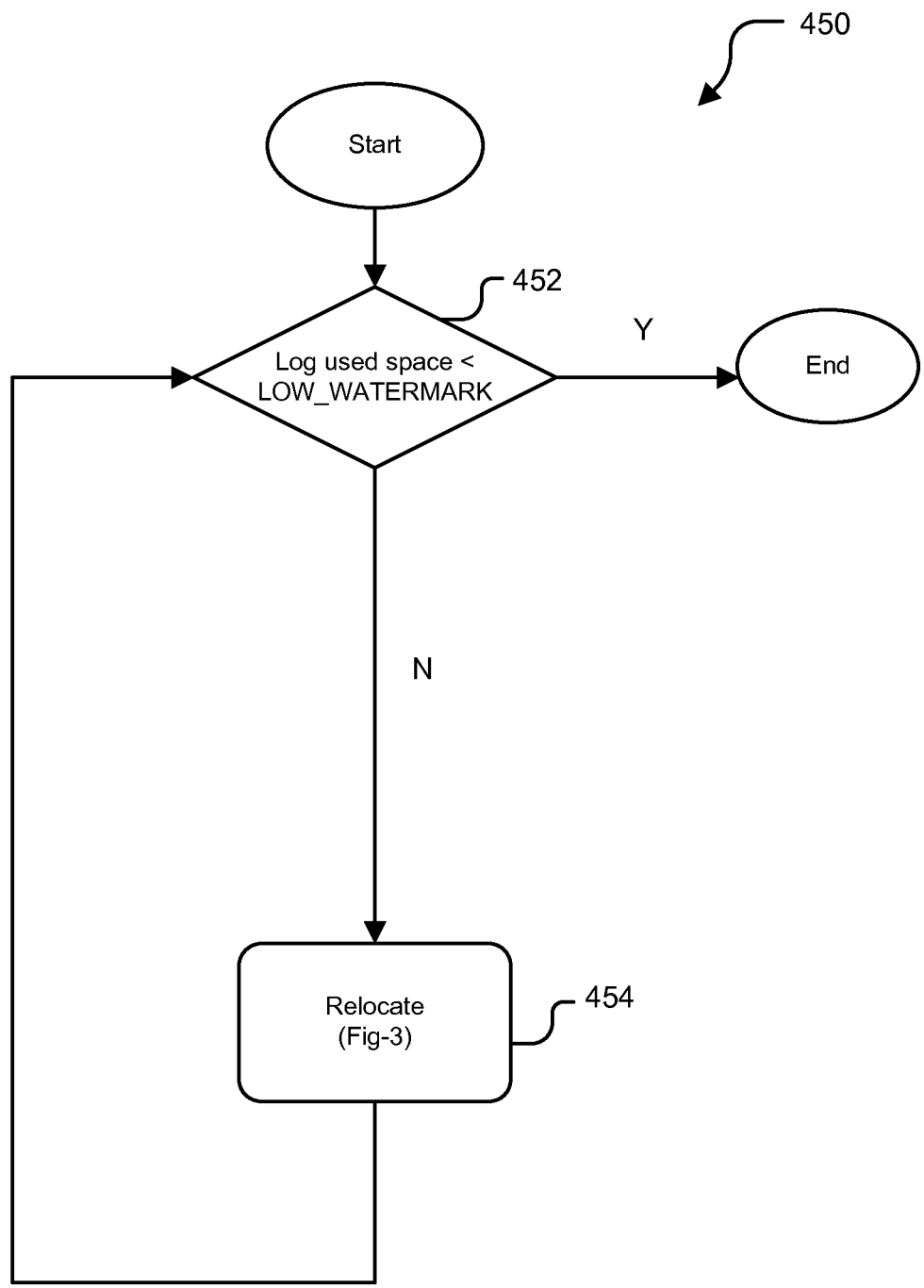
FIG. 15 is a flowchart of a method for reclaiming space in the log in the container comprising the plurality of solid-state disks used in the caching system of FIG. 1.

FIG. 15 shows a method 450 to reclaim space in the log. At 452, control determines whether the used space in the log is less than or equal to a predetermined threshold. At 454, if the used space in the log is not less than or equal to a predetermined threshold, control performs the method 400 for relocating data from head to tail of a log in the container as shown in FIG. 14, and control returns to 452.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A system comprising:
   a partitioning module configured to partition each of a plurality of solid-state disks into a plurality of blocks, wherein each of the plurality of blocks has a predetermined size;
   a writing module configured to write data to one or more of the plurality of solid-state disks in a sequence starting from a first block of a first solid-state disk of the plurality of solid-state disks to a first block of a last solid-state disk of the plurality of solid-state disks, and subsequently starting from a second block of the first solid-state disk to a second block of the last solid-state disk,
   wherein in each of the plurality of solid-state disks, the second block is subsequent to the first block, and
   wherein prior to storing the data in a memory external to the plurality of solid-state disks, the writing module is configured to write the data and a copy of the data in two consecutive blocks in the sequence;
   a selection module configured to (i) evict clean data used at less than a predetermined frequency from the plurality of solid-state disks, and (ii) move (a) clean data used at greater than the predetermined frequency and (b) dirty data to first available free blocks within the plurality of solid-state disks using a reverse metadata lookup table by writing the moved data in the first available free blocks sequentially within each of the plurality of solid-state disks and striped across the plurality of solid-state disks,
   wherein the reverse metadata lookup table maps blocks to metadata entries stored in a cache metadata lookup table indicating state of data in the blocks, and
   wherein clean data is data of which a copy is stored in the plurality of solid-state disks and in the memory external to the plurality of solid-state disks, and wherein dirty data is data of which a copy is stored in the plurality of solid-state disks but not in the memory external to the plurality of solid-state disks; and
   an erasing module configured to erase blocks freed up by the moved data and release the erased blocks for reuse.

2. The system of claim 1, further comprising:
   a dividing module configured to divide the data into a plurality of portions, wherein the writing module is configured to write the plurality of portions respectively to the plurality of blocks in the sequence.

3. The system of claim 1, wherein the erasing module is configured to erase one or more consecutive blocks in the sequence in response to a number of blocks available for writing in the plurality of solid-state disks being less than or equal to a predetermined threshold, and in response to the data written in the one or more consecutive blocks in the sequence being stored in the memory external to the plurality of solid-state disks.

4. The system of claim 1, wherein the erasing module is configured to erase one or more consecutive blocks in the sequence in response to the data written in the one or more consecutive blocks in the sequence being stored in the memory external to the plurality of solid-state disks, and in response to the data written in the one or more consecutive blocks in the sequence being used at a frequency less than or equal to a predetermined frequency.

5. The system of claim 1, wherein:
the selection module is configured to select two consecutive blocks in the sequence in which the data and a copy of the data is written in response to the data being not stored in the memory external to the plurality of solid-state disk; and
the erasing module is configured to erase the two consecutive blocks,
wherein the selection module is configured to select the two consecutive blocks in response to a number of blocks available for writing in the plurality of solid-state disks decreasing to a predetermined threshold, and
wherein the writing module is configured to write the data from the two consecutive blocks respectively to two consecutive available blocks in the sequence prior to the erasing module erasing the two consecutive blocks, and
wherein the two consecutive available blocks are subsequent to a last written block in the sequence.

6. The system of claim 5, further comprising:
nonvolatile memory configured to store metadata received with the data, wherein the nonvolatile memory is separate from the plurality of solid-state disks; and
an updating module configured to update the metadata in response to the writing module writing the data from the two consecutive blocks respectively to the two consecutive available blocks in the sequence.

7. The system of claim 1, wherein:
the selection module is configured to select one or more consecutive blocks in the sequence in response to the data written in one or more blocks in the sequence being used at a frequency greater than or equal to a predetermined frequency; and
the erasing module is configured to erase the one or more consecutive blocks,
wherein the writing module is configured to write the data from the one or more consecutive blocks respectively to one or more consecutive available blocks in the sequence, and
wherein the one or more consecutive available blocks are subsequent to a last written block in the sequence.

8. The system of claim 7, further comprising:
nonvolatile memory configured to store metadata received with the data, wherein the nonvolatile memory is separate from the plurality of solid-state disks; and
an updating module configured to update the metadata in response to the writing module writing the data from the one or more consecutive blocks respectively to one or more consecutive available blocks in the sequence.

9. The system of claim 1, further comprising:
a removal module configured to remove one of the plurality of solid-state disks; and
an exclusion module configured to exclude, from the sequence, blocks associated with the removed solid-state disk.

10. The system of claim 1, further comprising:
an adding module configured to add an additional solid-state disk to the plurality of solid-state disks;
wherein the partitioning module is configured to partition the additional solid-state disk into a plurality of additional blocks; and
an inclusion module configured to include the plurality of additional blocks in the sequence.

11. A method comprising:
dividing each of a plurality of solid-state disks into a plurality of blocks, wherein each of the plurality of blocks has a predetermined size;
writing data to one or more of the plurality of solid-state disks in a sequence starting from a first block of a first solid-state disk of the plurality of solid-state disks to a first block of a last solid-state disk of the plurality of solid-state disks, followed by starting from a second block of the first solid-state disk to a second block of the last solid-state disk, wherein in each of the plurality of solid-state disks, the second block is subsequent to the first block;
prior to storing the data being in a memory external to the plurality of solid-state disks, writing the data and a copy of the data in two consecutive blocks in the sequence;
evicting clean data used at less than a predetermined frequency from the plurality of solid-state disks, wherein clean data is data of which a copy is stored in the plurality of solid-state disks and in the memory external to the plurality of solid-state disks;
moving (a) clean data used at greater than the predetermined frequency and (b) dirty data to first available free blocks within the plurality of solid-state disks using a reverse metadata lookup table by writing the moved data in the first available free blocks sequentially within each of the plurality of solid-state disks and striped across the plurality of solid-state disks, wherein the reverse metadata lookup table maps blocks to metadata entries stored in a cache metadata lookup table indicating state of data in the blocks, and wherein dirty data is data of which a copy is stored in the plurality of solid-state disks but not in the memory external to the plurality of solid-state disks; and
erasing blocks freed up by the moved data and release the erased blocks for reuse.

12. The method of claim 11, further comprising:
dividing the data into a plurality of portions; and
writing the plurality of portions respectively to the plurality of blocks in the sequence.

13. The method of claim 11, further comprising in response to a number of blocks available for writing in the plurality of solid-state disks being less than or equal to a predetermined threshold, and in response to the data written in one or more consecutive blocks in the sequence being stored in the memory external to the plurality of solid-state disks:

erasing the one or more consecutive blocks in the sequence.

14. The method of claim 11, further comprising in response to the data written in one or more blocks in the sequence being stored in the memory external to the plurality of solid-state disks, and in response to the data written in one or more consecutive blocks in the sequence being used at a frequency less than or equal to a predetermined frequency:
   erasing the one or more consecutive blocks in the sequence.

15. The method of claim 11, further comprising in response to a number of blocks available for writing in the plurality of solid-state disks decreasing to a predetermined threshold, and in response to the data written in one or more blocks in the sequence being not stored in the memory external to the plurality of solid-state disks:
   selecting two consecutive blocks in the sequence in which the data and a copy of the data is written;
   writing the data from the two consecutive blocks respectively to two consecutive available blocks in the sequence, wherein the two consecutive available blocks are subsequent to a last written block in the sequence; and
   erasing the two consecutive blocks.

16. The method of claim 15, further comprising:
   storing metadata received with the data; and
   updating the metadata in response to writing the data from the two consecutive blocks respectively to the two consecutive available blocks in the sequence.

17. The method of claim 11, further comprising in response to the data written in one or more blocks in the sequence being used at a frequency greater than or equal to a predetermined frequency:
   selecting one or more consecutive blocks in the sequence;
   writing the data from the one or more consecutive blocks respectively to one or more consecutive available blocks in the sequence, wherein the one or more consecutive available blocks are subsequent to a last written block in the sequence; and
   erasing the one or more consecutive blocks.

18. The method of claim 17, further comprising:
   storing metadata received with the data; and
   updating the metadata in response to writing the data from the one or more consecutive blocks respectively to one or more consecutive available blocks in the sequence.

19. The method of claim 11, further comprising:
   removing one of the plurality of solid-state disks; and
   excluding, from the sequence, blocks associated with the removed solid-state disk.

20. The method of claim 11, further comprising:
   adding an additional solid-state disk to the plurality of solid-state disks;
   partitioning the additional solid-state disk into a plurality of additional blocks; and
   including the plurality of additional blocks in the sequence.

21. The system of claim 1, wherein the partitioning module is configured to generate a data structure for each of the plurality of solid-state disks, the data structure including a reverse lookup table used to update metadata when data is moved within the plurality of solid-state disks to reclaim space, wherein the reverse lookup table maps container block numbers to metadata entries in a cache lookup table, where a container is a group of the plurality of solid-state disks, and a container block number identifies the plurality of blocks having the predetermined size into which the plurality of solid-state disks are partitioned, and where the cache lookup table includes the metadata entries that map logical block numbers to the container block numbers.

22. The method of claim 11, further comprising generating a data structure for each of the plurality of solid-state disks, the data structure including a reverse lookup table used to update metadata when data is moved within the plurality of solid-state disks to reclaim space, wherein the reverse lookup table maps container block numbers to metadata entries in a cache lookup table, where a container is a group of the plurality of solid-state disks, and a container block number identifies the plurality of blocks having the predetermined size into which the plurality of solid-state disks are partitioned, and where the cache lookup table includes the metadata entries that map logical block numbers to the container block numbers.

\* \* \* \* \*